Oct. 29, 1968  N. G. DI NICOLA  3,407,562
CAPACITOR ASSEMBLY METHOD
Filed May 11, 1965  3 Sheets-Sheet 1
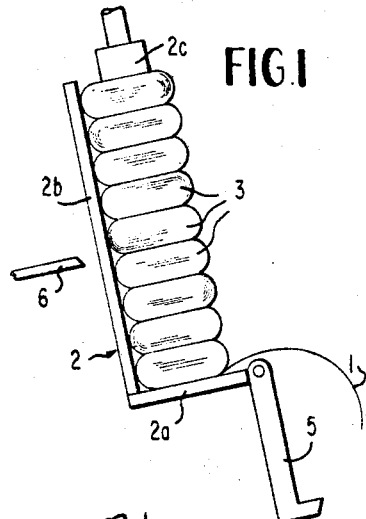
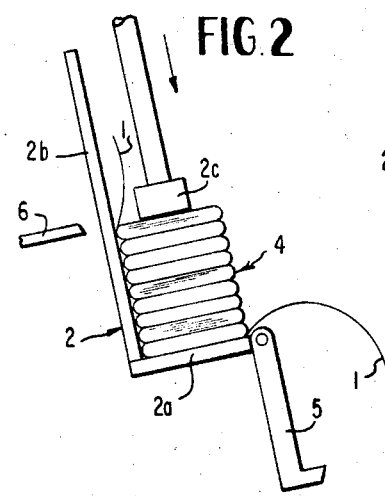
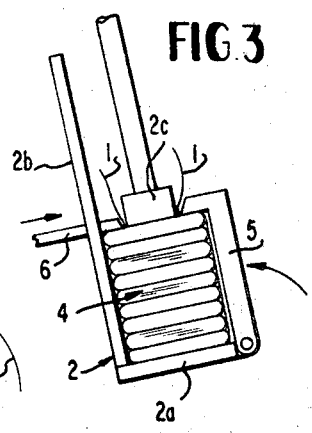
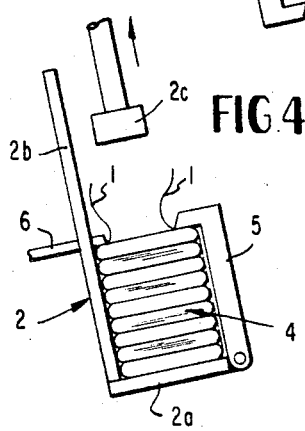
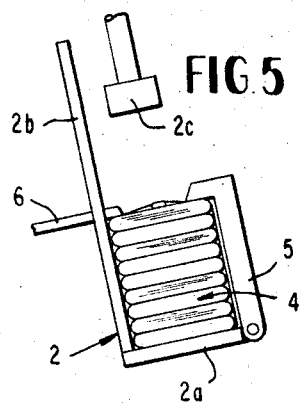
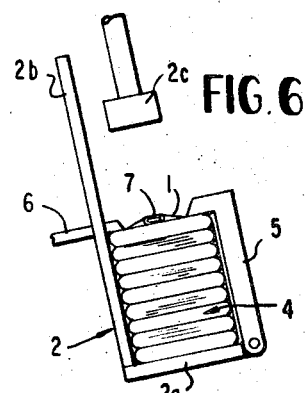
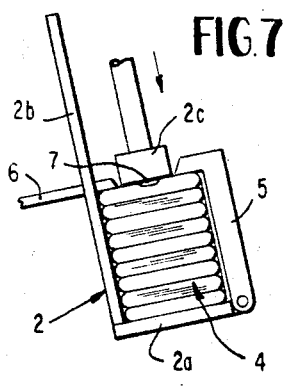
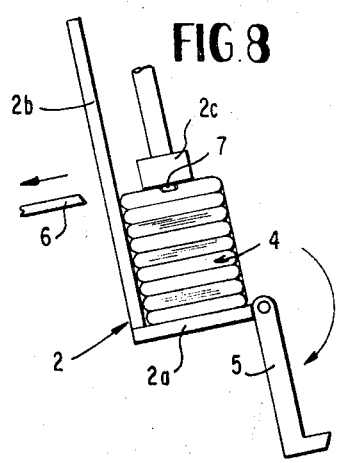
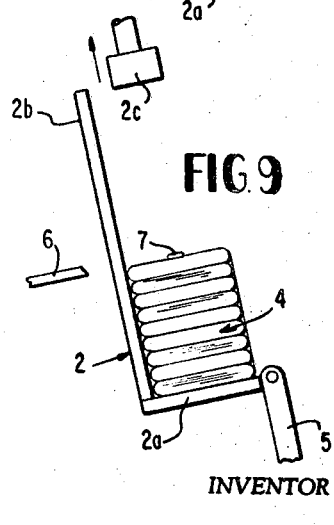
INVENTOR
NICOLA G. DI NICOLA
BY *Harold A. Levy, Jr.*
ATTORNEY

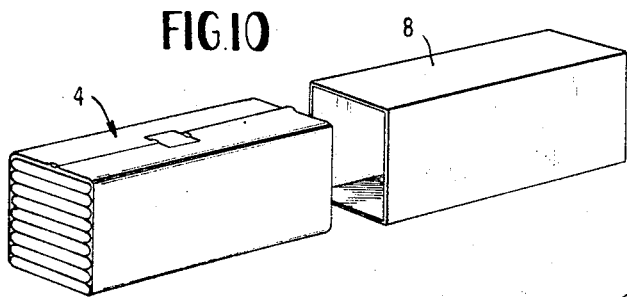
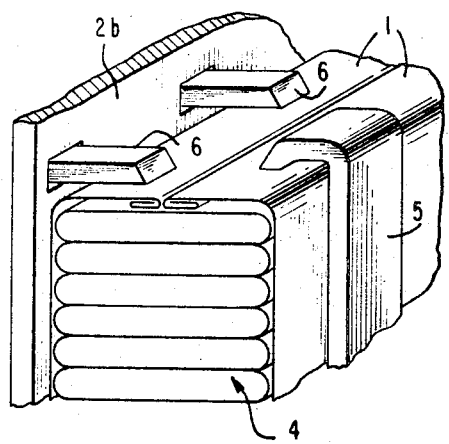
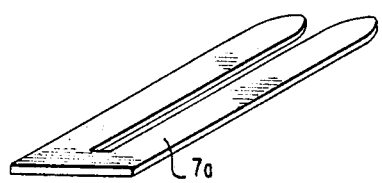
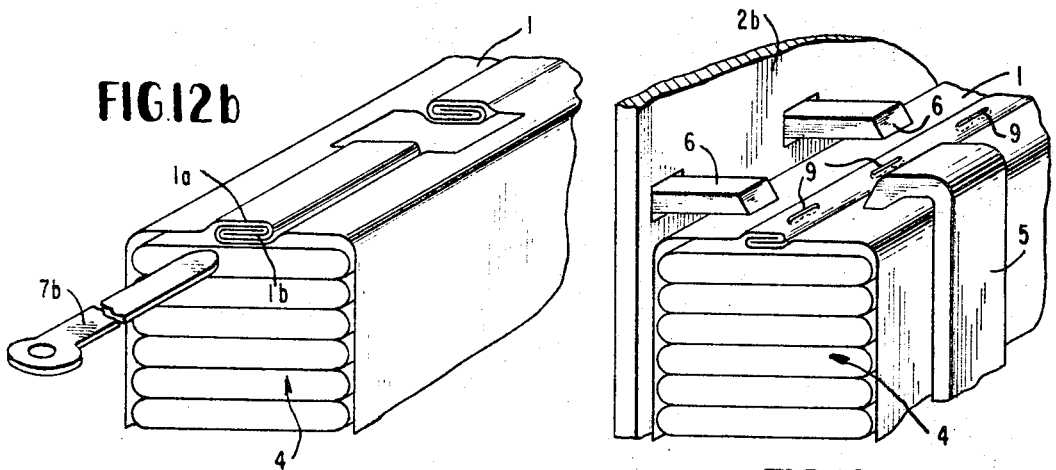
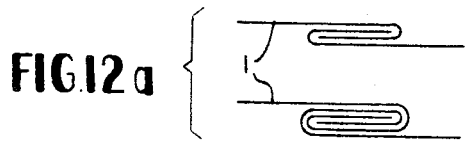

Oct. 29, 1968   N. G. DI NICOLA   3,407,562
CAPACITOR ASSEMBLY METHOD
Filed May 11, 1965   3 Sheets-Sheet 3

INVENTOR
NICOLA G. DI NICOLA
BY
ATTORNEY

United States Patent Office 3,407,562
Patented Oct. 29, 1968

3,407,562
CAPACITOR ASSEMBLY METHOD
Nicola Gustino Di Nicola, Glens Falls, N.Y., assignor to General Electric Company, a corporation of New York
Filed May 11, 1965, Ser. No. 454,851
3 Claims. (Cl. 53—24)

ABSTRACT OF THE DISCLOSURE

A capacitor roll pressing and wrapping apparatus incorporating clamping means to retain a plurality of stacked rolls in pressed condition while a wrapper is releasably secured about the stack. The wrapped stack is removed from the pressing apparatus, inserted in a casing, and the wrapper is released to permit expansion of the rolls in the casing.

---

This invention relates to a capacitor assembly method and, more particularly, a method for assembling a plurality of capacitor rolls in a capacitor housing.

The capacitors employed in power distribution systems must be tailored to receive relatively large quantities of reactive volt amperes at high voltages. In order to achieve this degree of performance, a composite capacitor is employed having a plurality of individual capacitor rolls, each of which consists of metal foil members, with insulating members therebetween, wound to form a capacitor roll. The plurality of capacitor roll members are mounted in housing to form a composite capacitor which is adaptable for field use on transmission lines or in similar functions.

Optimum composite capacitor characteristics are achieved by employing a maximum number of capacitor rolls within each capacitor housing. Increased capacitance is also realized by reducing the insulating gap between adjacent metal foil electrodes. However, the insulating gap must be uniformly controlled to maintain the designed capacitance of each capacitor coming off mass production facilities.

In order to provide the maximum number of capacitor rolls in the capacitor housing and to insure that the gap between adjacent foil electrodes in each roll is reduced to a minimum in opposition to the natural force of each roll to unravel and separate, it has been found necessary to compress the capacitor rolls into a roll pack before inserting them into the capacitor housing. One method of assembling, compressing and inserting the roll pack into the capacitor housing has included: (1) compressing a plurality of rolls between a pair of metallic channel members; (2) binding the compressed roll packs by slipping a steel band around each end of the pack; (3) baking the compressed pack for several hours to "set" each pack to reduce the tendency of each roll to unravel upon removal of the steel bands and the rigid channels; (4) subsequently removing the binding and channels and replacing the binding with paper straps and insulation, and (5) finally inserting the paper bound, compressed and "set" roll pack into the capacitor housing.

Because of the variety of steps required in the conventional assembly method, there is an increased danger of damaging the individual capacitor rolls thereby to short out and destroy one or more rolls. Also, since the capacitance is a function of the electrode spacing, designing and maintaining production line uniformity is further complicated by having to "set" each roll pack to the same dimensions.

It is therefore one object of this invention to provide an improved method for assembling a plurality of capacitor rolls into a capacitor housing.

Another object is to provide an improved method which eliminates the need for baking capacitor rolls when assembling the rolls into a capacitor housing.

A further object is to provide a method which eliminates the need for removing the binding around a plurality of capacitor rolls forming a compressed pack before assembling the pack into a capacitor housing.

A still further object is to provide a method for assembling a plurality of individual capacitor rolls to form composite capacitors having uniform capacitance.

In accordance with this invention in one form thereof, a paper wrapper insulating member is placed over the fixed block of a press apparatus. Individual capacitor roll members are then stacked on the paper-covered fixed press block. A movable press block is then advanced toward the fixed press block to force the plurality of capacitor rolls into a pressed roll pack. The ends of the paper wrapper-insulator are secured together to maintain the roll pack in a compressed state. The movable press block is then moved away from the fixed press block and the roll pack is removed from the press and inserted into a capacitor housing. The paper wrapper-insulator insulates the roll pack from the interior surface of the capacitor housing, while at the same time the paper wrapper-insulator maintains the roll pack in a compressed state, thus obviating the need for additional baking steps to "set" the pack to reduce the tendency of each capacitor roll to unravel during insertion into the capacitor housing. After insertion, the wrapper can be released to allow the rolls to expand to the inner dimensions of the housing.

For a better understanding of this invention, reference is made to the accompanying drawings in which:

FIG. 1 illustrates the unpressed capacitor rolls stacked on a press on top of a wrapper prior to the pressing step;

FIG. 2 illustrates the pressing step;

FIG. 3 illustrates the clamping step;

FIG. 4 illustrates the capacitor assembly prior to the wrapper folding step;

FIG. 5 illustrates the wrapper folding step;

FIG. 6 illustrates the capacitor assembly after a bayonet has been inserted during one embodiment of the securing step;

FIG. 7 illustrates the repress step to facilitate the unclamping step;

FIG. 8 illustrates the unclamping step;

FIG. 9 illustrates the capacitor assembly prior to insertion to the capacitor housing;

FIG. 10 illustrates the roll pack being placed into a capacitor housing;

FIG. 11 illustrates a first embodiment of the folding step;

FIG. 11a illustrates two types of folds which may be employed in the first embodiment of the folding step;

FIG. 11b illustrates a bayonet for securing the ends of the wrapper in the first embodiment of the folding step;

FIG. 12 illustrates a second embodiment of the folding step;

FIG. 12a illustrates two folds which may be employed in the second embodiment of the folding step;

FIG. 12b illustrates the folds of the embodiment of FIG. 12 with the addition of a securing bayonet.

Figure 13:
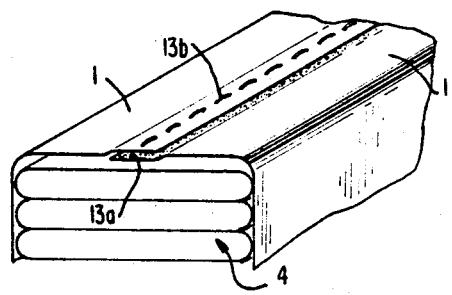
FIGS. 13–18 illustrate further arrangements which may be used during the folding and securing steps.

Referring to FIG. 1, a wrapper 1 is first placed on a press 2 which is comprised of a stationary press block 2a, a stationary wall member 2b, and a movable press block 2c. A plurality of individual capacitor rolls 3 are then stacked on the stationary press block 2a. Each individual capacitor roll 3 is comprised of at least two electrodes, normally composed of aluminum foil, separated by a layer of insulation. The aluminum foil electrodes and the insulation are rolled into a loose structure which is easily pressed as indicated in FIG. 2. The movable press block 2c is lowered to press the capacitor rolls into a roll pack 4. In one instance, it was found that a force of twelve tons was sufficient to compress twenty rolls into a roll pack having a dimension which was less than one-half the original, relaxed dimension.

After the individual rolls 3 have been compressed, a front clamp member 5 is pivoted upwardly to engage the front portion of the top roll which is not contacted by the movable press block 2c. Simultaneously, a plurality of rear clamp members 6 are projected through the back wall 2 in order to engage the rear edge portion of the roll. This is best illustrated in FIG. 3. The front clamp 5 and the rear clamp 6 maintain the roll pack 4 in a compressed state so that the movable press block 2c may be moved upwardly and out of contact with the roll pack 4 as indicated in FIG. 4.

The edges of the wrapper 1 which project from under the clamps 5 and 6 are folded as indicated in FIG. 5. A bayonet member 7 is inserted into the fold as indicated in FIG. 6 mutually to secure the ends of the wrapper. The movable press block is then lowered as indicated in FIG. 7 so that the clamping members 5 and 6 may be released as indicated in FIG. 8. After the clamping members 5 and 6 are released, the movable press block 2c is raised and the completed roll pack 4 is lifted therefrom and inserted into a capacitor housing 8, as indicated in FIG. 10. After the pack is inserted into the capacitor housing 8, the bayonet 7 is withdrawn therefrom so that the previously compressed capacitor rolls 3 may expand to the interior dimensions of the capacitor housing, which has been uniformly designed to provide controlled expansion of the capacitor rolls to enable thereby maintenance of uniform capacitor characteristics.

One embodiment of arrangements for use in the step of mutually securing the ends of the wrapper 1 is illustrated in FIG. 11. The ends of the wrapper 1 are folded with a single fold or a double fold as illustrated in FIG. 11a. A bayonet 7a as illustrated in FIG. 11b is then inserted into the folds to mutually secure the ends of the wrapper 1.

In FIG. 12, a second embodiment of the step of mutually securing the ends of the wrapper 1 is disclosed. The ends of the wrapper 1 are folded to form a single or double fold interlock as illustrated in FIG. 12a, after which staple members 9 are forced through the fold mutually to secure the ends of the wrapper. The staple members may be subsequently removed after the roll pack has been inserted into the housing 8 (in FIG. 10) to enable the rolls 3 to expand within the housing. Alternatively, the wrapper may be split and the folds may be made in opposite directions between adjacent flaps 1a and 1b, as illustrated in FIG. 12b, and a single prong bayonet 7b may be inserted through the center of alternate folds mutually to secure the ends of the wrapper 1.

In a third embodiment of the step of mutually securing the wrapper ends, the ends of the wrapper 1 are secured by applying a layer of adhesive 13a (FIG. 13) therebetween. In the alternative the overlapped portion may be sewn together by threads 13b mutually to secure the ends of the wrapper 1. In cases where higher compression of the rolls is desired, the wrapper fold may be both stitched and cemented as shown in FIG. 13. It will be noted, however, that in order to disengage the ends of the wrapper 1 when secured as illustrated in FIG. 13, the wrapper must be cut.

Figure 14:
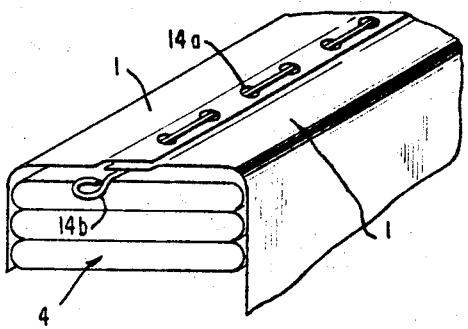
Figure 15:
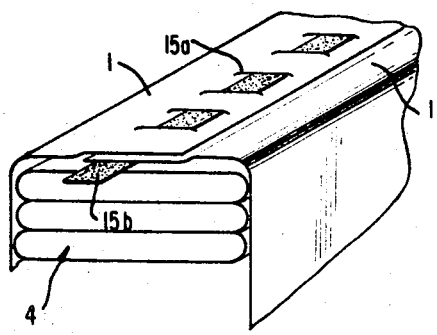
Figure 16:
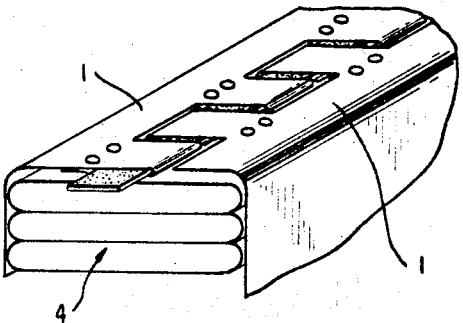

FIGS. 14 and 15 illustrate further embodiments wherein the ends of the wrapper are provided with apertures 14a and 15a through which a pin or band member 14b and 15b is threaded.

Figure 17:
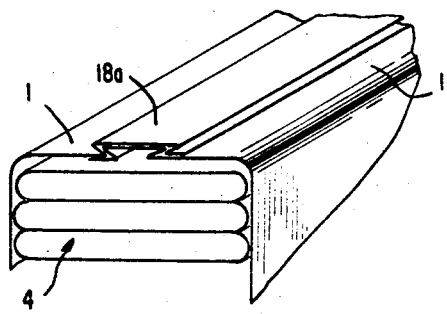
Figure 18:
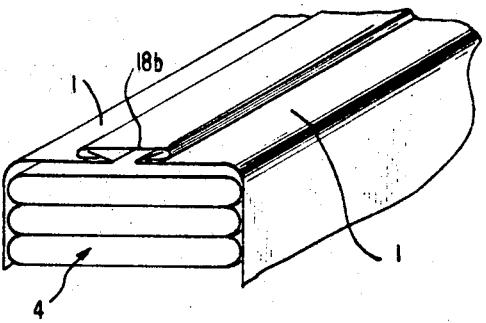

FIGS. 17 and 18 illustrate still further embodiments for securing the ends of the wrapper 1. In the embodiments of FIGS. 17 and 18 each end of the wrapper 1 is folded to form complementary dovetail portions which are mutually engaged and secured by a sleeve 18a and 18b respectively of paper or light metallic material which engages folded portions of the wrapper 1.

From the foregoing discussion, it will be apparent that the method for assembling a plurality of capacitor rolls in a capacitor housing enables the production of improved capacitors while eliminating the need for baking the capacitor rolls, and eliminating the need for applying temporary binding members which must later be removed and which require additional steps in the assembly operation.

While several specific embodiments of this invention have been shown and described, it is not intended that the invention be limited to the particular structure shown and it is intended by the appended claims to cover all modifications within the spirit and scope of this invention.

What I claim as new and desire to secure by Letters Patent of the United States is:

1. A method of assembling a capacitor comprising the steps of:
    (a) placing a wrapper member over a fixed press block,
    (b) stacking a plurality of capacitor rolls on the fixed press block and on the wrapper,
    (c) pressing the capacitor rolls,
    (d) folding the wrapper around the compressed capacitor rolls,
    (e) applying releasable securing means to said wrapper to maintain said rolls in compressed conditions,
    (f) removing the wrapped capacitor rolls from the press,
    (g) placing the wrapped capacitor rolls into a capacitor housing, and
    (h) releasing the wrapper securing means for enabling the capacitor rolls to expand to the interior dimensions of the capacitor housing.

2. The invention as recited in claim 1 wherein said releasable securing means comprises a separate removable member.

3. The invention as recited in claim 2 wherein said removable member comprises an insert member.

References Cited

UNITED STATES PATENTS

| | | | |
|---|---|---|---|
| 1,557,881 | 10/1925 | Rogers | 53—24 X |
| 1,864,775 | 6/1932 | Straubel | 53—124 |
| 3,108,413 | 10/1963 | Odell | 53—24 |

TRAVIS S. McGEHEE, *Primary Examiner.*

R. L. FARRIS, *Assistant Examiner.*